US009355388B2

(12) United States Patent
Balachandran et al.

(10) Patent No.: US 9,355,388 B2

(45) Date of Patent: May 31, 2016

(54) SCHEDULING FOR SERVICE PROJECTS VIA NEGOTIATION

(71) Applicant: International Business Machines Corporation, Armonk, NY (US)

(72) Inventors: T. K. Balachandran, Raleigh, NC (US); Pu Huang, Yorktown Heights, NY (US); Kaan K. Katircioglu, Yorktown Heights, NY (US); Ta-Hsin Li, Danbury, CT (US); Ying Li, Mohegan Lake, NY (US); Axel Martens, White Plains, NY (US); Rakesh Mohan, Cortlandt Manor, NY (US); Krishna C. Ratakonda, Yorktown Heights, NY (US); Richard B. Segal, Chappaqua, NY (US); Lisa A. Smith, Denver, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 13/966,706

(22) Filed: Aug. 14, 2013

(65) Prior Publication Data

US 2015/0052182 A1 Feb. 19, 2015

(51) Int. Cl.

| | |
|---|---|
| ***G06F 15/16*** | (2006.01) |
| ***G06Q 10/10*** | (2012.01) |
| ***H04L 12/24*** | (2006.01) |
| ***G06Q 10/04*** | (2012.01) |
| ***G06Q 10/06*** | (2012.01) |

(52) U.S. Cl.

CPC ............ *G06Q 10/1097* (2013.01); *G06Q 10/04* (2013.01); *G06Q 10/06* (2013.01); *H04L 41/50* (2013.01); *H04L 41/5006* (2013.01)

(58) Field of Classification Search

CPC ... G06Q 10/1097; G06Q 10/04; G06Q 10/06; H04L 41/50

USPC .......................................... 709/203, 224, 226

See application file for complete search history.

(56) References Cited

U.S. PATENT DOCUMENTS

| | | | | |
|---|---|---|---|---|
| 4,894,773 A * | 1/1990 | Lagarias | ...................... | 705/7.11 |
| 5,408,663 A * | 4/1995 | Miller | ........................... | 718/104 |
| 5,745,758 A * | 4/1998 | Shaw et al. | ................... | 718/102 |
| 5,781,731 A * | 7/1998 | Koreeda et al. | ............... | 709/204 |
| 5,832,289 A * | 11/1998 | Shaw et al. | ..................... | 712/30 |
| 6,510,431 B1 | 1/2003 | Eichstaedt et al. | | |
| 6,952,700 B2 | 10/2005 | Modha et al. | | |
| 7,433,856 B2 | 10/2008 | Wu et al. | | |

(Continued)

OTHER PUBLICATIONS

Dffice Action dated Jul. 28, 2015 received in U.S. Appl. No. 14/023,951.

*Primary Examiner* — Michael Y Won

(74) *Attorney, Agent, or Firm* — Scully, Scott, Murphy & Presser, P.C.; Louis J. Percello, Esq.

(57) ABSTRACT

Assignment scheduling for service projects, in one aspect, may comprise preparing input parameter data for servicing a client service request; generating a schedule for servicing the client service request by executing an optimization algorithm with the input parameter data; determining whether the schedule is acceptable by the client; and repeating automatically the preparing, the generating, the transmitting and the determining until it is determined that the schedule is acceptable by the client, wherein each iteration automatically prepares different input parameter data for inputting to the optimization algorithm and generates a different schedule based on the different input parameter data.

6 Claims, 11 Drawing Sheets

Client

Service Provider

102 Post service request on Web

104 Acquire service request through Web-service interface

106 Parse request

D

108 Prepare for optimization engine

110 Run optimization engine to find the best project schedule

C

112 Propose schedule through Web-service interface

114 Receive and parse proposal

A

B

(56) References Cited

U.S. PATENT DOCUMENTS

| | | | | |
|---|---|---|---|---|
| 7,596,523 | B2 * | 9/2009 | Sobel et al. | 705/36 R |
| 7,792,786 | B2 | 9/2010 | Chen et al. | |
| 7,839,882 | B2 | 11/2010 | Soliman | |
| 8,078,487 | B2 * | 12/2011 | Li et al. | 705/7.22 |
| 8,700,738 | B2 * | 4/2014 | Moore et al. | 709/219 |
| 2002/0116234 | A1 | 8/2002 | Nagasawa | |
| 2004/0151187 | A1 | 8/2004 | Lichtenstein | |
| 2005/0049901 | A1 | 3/2005 | Diao et al. | |
| 2005/0086306 | A1 | 4/2005 | Lemke | |
| 2005/0234577 | A1 * | 10/2005 | Loughran et al. | 700/100 |
| 2006/0190605 | A1 | 8/2006 | Franz et al. | |
| 2006/0247959 | A1 * | 11/2006 | Oden | 705/7 |
| 2008/0262890 | A1 * | 10/2008 | Korupolu et al. | 705/8 |
| 2008/0288266 | A1 | 11/2008 | Diao et al. | |
| 2008/0294279 | A1 * | 11/2008 | Tiozzo | 700/100 |
| 2009/0059814 | A1 * | 3/2009 | Nixon et al. | 370/254 |
| 2009/0089092 | A1 * | 4/2009 | Johnson et al. | 705/2 |
| 2009/0106068 | A1 * | 4/2009 | Bhamidipaty et al. | 705/8 |
| 2009/0240551 | A1 | 9/2009 | Writz et al. | |
| 2010/0180212 | A1 | 7/2010 | Gingras et al. | |
| 2010/0257015 | A1 | 10/2010 | Molander | |
| 2010/0281166 | A1 | 11/2010 | Buyya et al. | |
| 2011/0022434 | A1 * | 1/2011 | Sun et al. | 705/7 |
| 2011/0106515 | A1 | 5/2011 | Bhamidipaty et al. | |
| 2014/0095181 | A1 * | 4/2014 | Johnson et al. | 705/2 |
| 2014/0365250 | A1 | 12/2014 | Ikeda et al. | |
| 2015/0178649 | A1 * | 6/2015 | Furman et al. | 705/7.22 |

* cited by examiner

SCHEDULING FOR SERVICE PROJECTS VIA NEGOTIATION

FIELD

The present application relates generally to computers, and computer applications, and more particularly to a computer-implemented system for scheduling for service projects, for example, automated system that negotiates scheduling of service projects.

BACKGROUND

Service providers manage their scheduling plan to meet customer requests. Clients and service providers typically interact through a one-way channel: clients come up with a request and pass it to a service provider, and the latter executes it. In this type of scenario, the service providers have little control over the plan. This may cause problems as the service provider may not be able to provide services that align with such plans. Sometimes clients and service providers re-negotiate the terms of requests, however, this is mostly done through verbal communication. Such iterative interpersonal communication between clients and service providers may not be efficient or effective.

BRIEF SUMMARY

A method for assignment scheduling for service projects, in one aspect, may comprise receiving a client service request. The method may also comprise preparing input parameter data associated with scheduling for servicing the client service request. The method may further comprise generating a schedule for servicing the client service request by executing an optimization algorithm with the input parameter data. The method may also comprise transmitting the schedule to a client. The method may further comprise determining whether the schedule is acceptable by the client. The method may also comprise repeating automatically the preparing, the generating, the transmitting and the determining until it is determined that the schedule is acceptable by the client, wherein each iteration prepares different input parameter data for inputting to the optimization algorithm and generates a different schedule based on the different input parameter data.

A system for assignment scheduling for service projects, in one aspect, may comprise an interface module operable to enable a client module and a server module to negotiate assignment scheduling associated with a project. A decision support engine may be operable to execute on a processor and further operable to receive a client service request via the interface module. The decision support engine may be further operable to prepare input parameter data associated with scheduling for servicing the client service request. The decision support engine may be further operable to generate a schedule for servicing the client service request by executing an optimization algorithm with the input parameter data. The decision support engine may be further operable to transmit the schedule to a client. The decision support engine may be further operable to determine whether the schedule is acceptable by the client. The decision support engine may be further operable to repeat automatically the preparing, the generating, the transmitting and the determining until it is determined that the schedule is acceptable by the client, wherein each iteration prepares different input parameter data for inputting to the optimization algorithm and generates a different schedule based on the different input parameter data.

A computer readable storage medium or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a mechanism is provided that formalizes and automates an iterative communication between a service requester (client) and a service provider that may lead to unambiguous, efficient communications and improvement of each party's financial benefits. Thus, a client and a service provider may communicate through a formal process or protocol to collaboratively maximize both parties' benefits. A system and a method may be provided that support such a communication process. Such system and a method may identify opportunities to shuffle requests (e.g., change starting and ending date) by taking into consideration available skills and asset profile.

The mechanism of the present disclosure in one embodiment takes into account the following aspects: Start and finish date requirements of work items; skill requirements for work items and amount of effort needed for the work items; Available workers, their skills, their costs and prices. The mechanism of the present disclosure in one embodiment allows optimal assignment so as to achieve one or more of many objectives. Examples of objectives may include gross profit (GP) maximization, service level agreement (SLA) attainment, revenue maximization, cost minimization. The decision variables in the optimization problem or function include assignment of work item.

Figure 1:
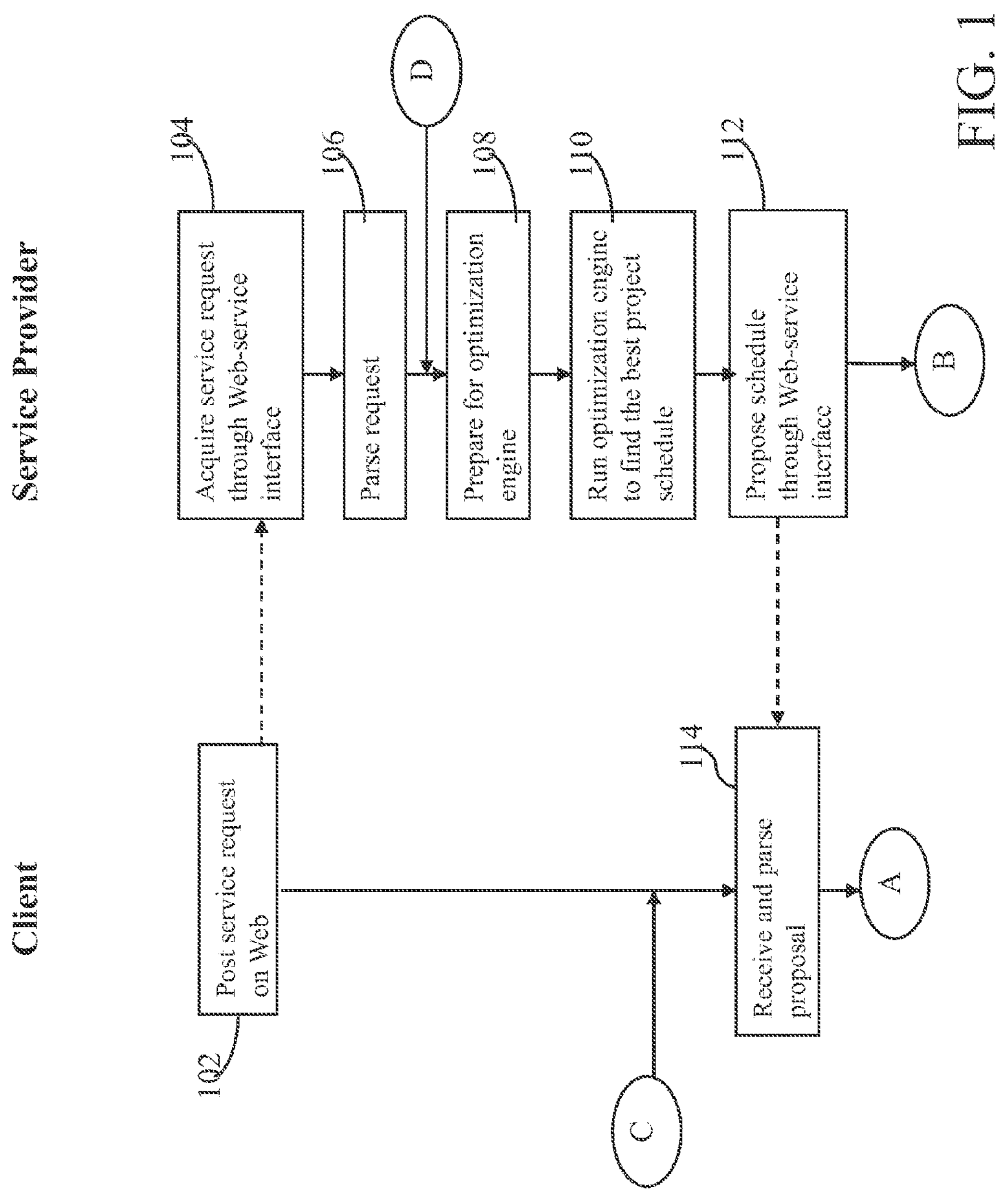
FIGS. 1 and 2 show a flow diagram illustrating a method of the present disclosure in one embodiment.
Figure 2:
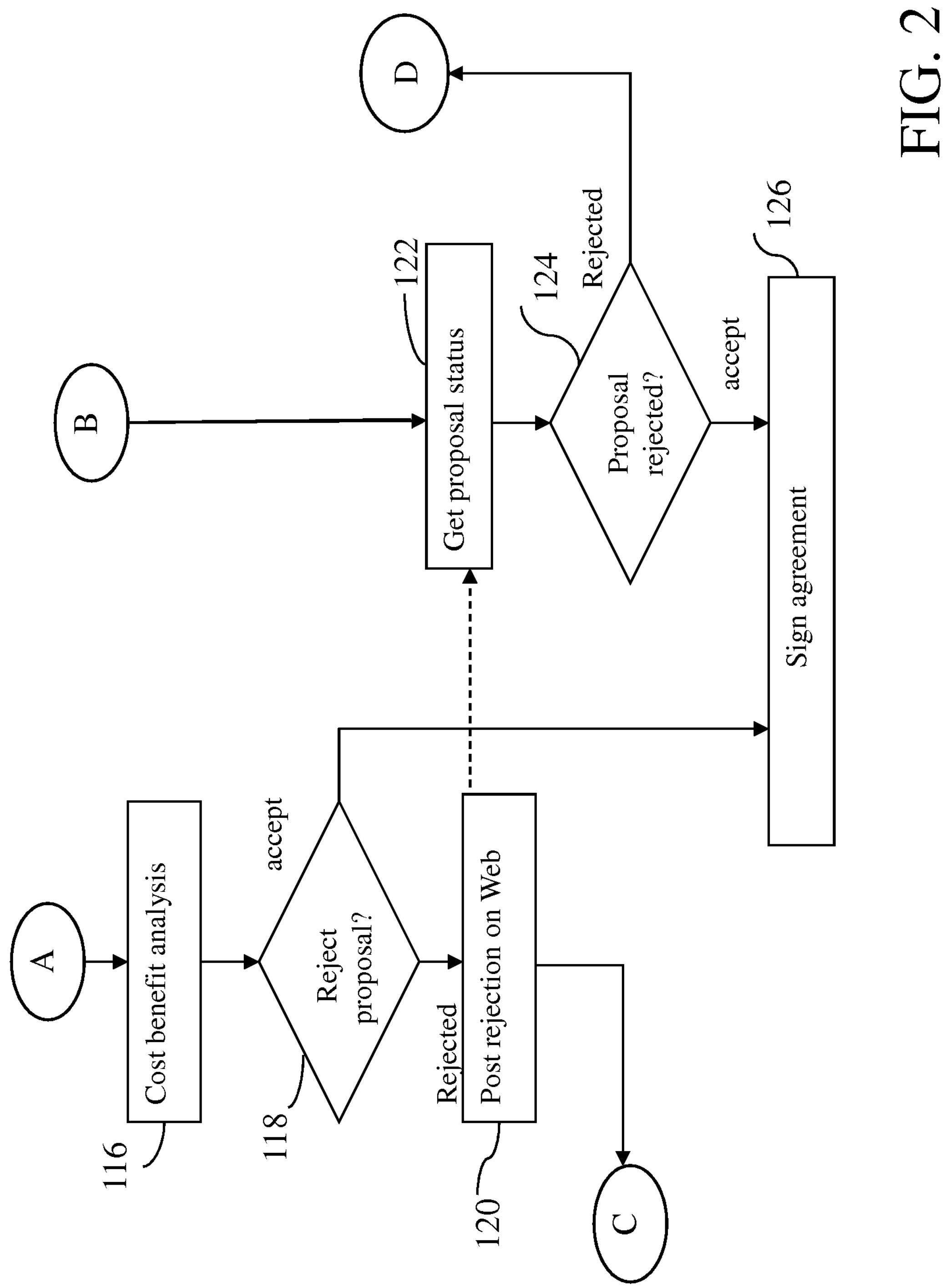

FIGS. 1 and 2 show a flow diagram illustrating a method of the present disclosure in one embodiment. At 102, a client, via a client computer module, may post a service request, e.g., on a service provider's online site on a world wide web (Web) or via another method. At 104, an automated computer module or algorithm (e.g., executed at the service provider) receives the service request, for example, via a Web-service interface. At 106, the automated computer module parses the request.

At 108, the automated computer module prepares data for an optimization engine. For instance, input parameters for an optimization engine may be gathered from a database of information.

At 110, the optimization engine is run to find a project schedule. The project schedule that the optimization engine outputs may be an optimized best schedule subject to one or more constraints of available workers, assets, organization structures, and/or others.

At 112, the output project schedule from running the optimization engine is proposed, e.g., through the Web-service interface.

At 114, a client module receives and parses the proposed schedule.

At 116, the client module may perform a cost-benefit analysis of the proposed schedule, e.g., whether the proposed schedule and for example the price proposed by the service provider is beneficial to the client.

At 118, the client, e.g., via the client module, may accept or reject the proposed schedule. At 120, to reject the schedule, the client module may post a rejection on the Web. The logic of the method may iterate or proceed back to 114, in which another proposal may be received. At 126, to accept the proposed schedule, the client module may sign and/or a signed agreement.

At 122, the service provider's module may receive the status of the proposal, e.g., whether the client has accepted or rejected the proposed schedule. At 124, in response to determining that the proposed scheduled was rejected, the automated module, e.g., at the service provider, may proceed to 118, in which optimization may be run with another set of parameters and/or constraints.

At 126, in response to determining that the proposed schedule was accepted, a service engagement agreement may be signed.

Figure 3:
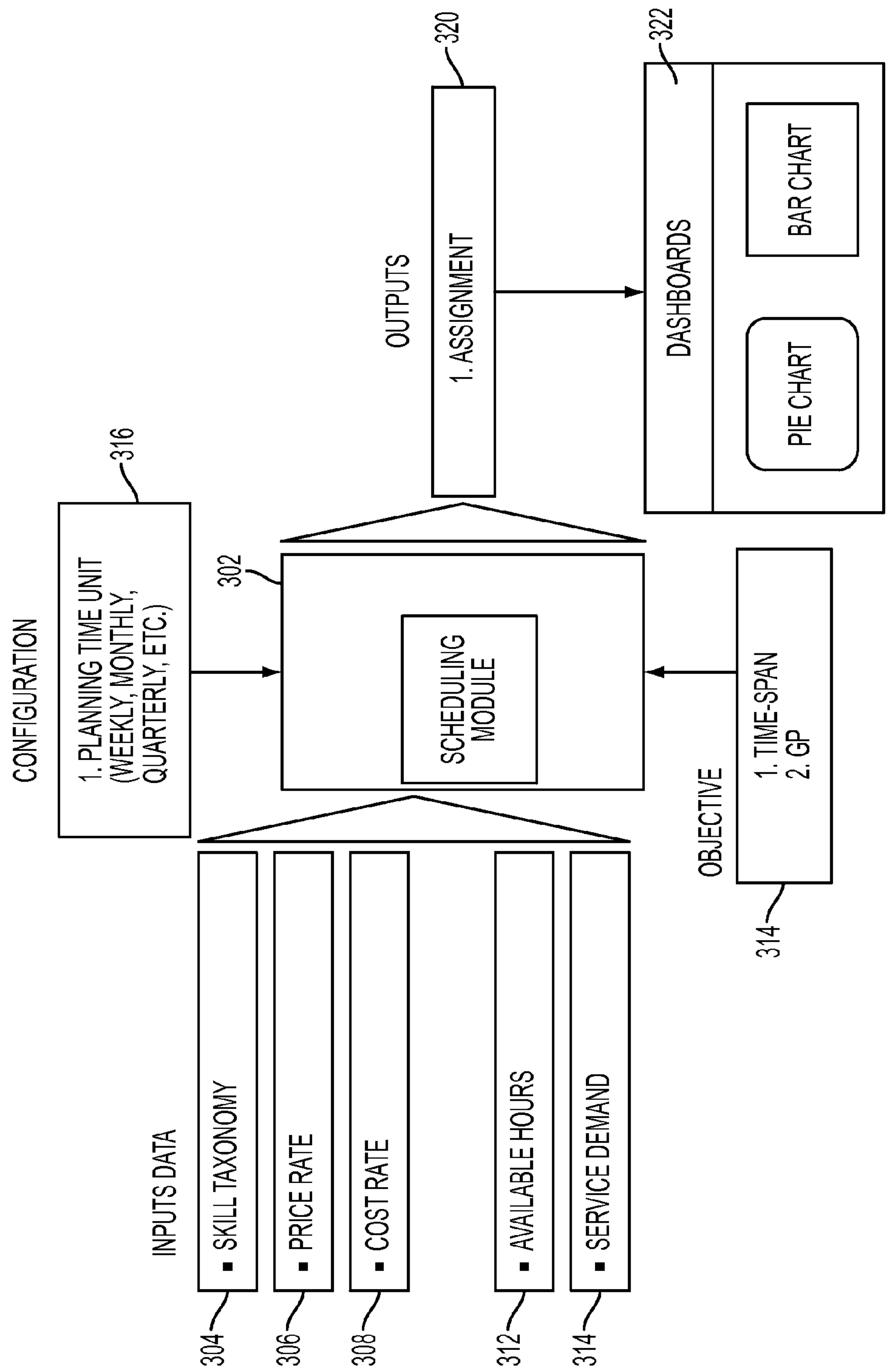
FIG. 3 is a diagram illustrating components of the present disclosure in one embodiment.

FIG. 3 is a diagram illustrating components of the present disclosure in one embodiment. An scheduling or planning engine or module 302 may include a computer executable module or algorithm that solves for assignment to work items problem, given one or more constraints to the problem. Such scheduling or planning problem may be formulated as an optimization problem. Inputs to the scheduling or planning module 302 may comprise skill taxonomy 304, price rate 306, cost rate 308, available hours 312, and service demand 314.

The skill taxonomy 304 specifies a defined language associated with skills understood between the negotiating parties. The price rate 306 may specify price charged for a service. The cost rate 308 may specify the cost of providing the service. The available hours 312 may specify amount of time available for providing the service. The forecast 314 may specify demand forecast.

The configuration at 316 specifies planning time unit, e.g., whether weekly, monthly, quarterly, or another time horizon.

The scheduling or planning module 302 outputs the assignment 320, which may comprise which worker, skill, and/or asset may be assigned to which work item.

The output of the schedule may also comprise a dashboard 322 presented on a computer screen or the like. The dashboard 322, e.g., may show assignment and/or skill distribution, geographic locations, financial projection and/or other data associated with the project, e.g., graphically using charts such as pie charts, bar charts and others.

A methodology of the present disclosure in one embodiment enables computer-to-computer negotiations between clients and service providers for schedule or assignment planning. A methodology of the present disclosure in one embodiment may also enable clients to control costs and QoS (Quality of Service) levels in a project-by-project basis. A methodology of the present disclosure in one embodiment may be provided, for example, as a Web service.

The following description identifies example patterns of service request communication between clients and service providers. The IT service market includes buyers (clients) and sellers (service providers). Typically, a transaction is initiated by a client. The client does this by specifying a set of service requests. These requests are then mapped into skill requirements. The service provider is responsible to provision and deliver assignments with the required skills to fulfill the requirements.

From a service provider's point of view, a tradeoff is to balance client satisfaction and service costs. Costs may be measured in term of currency, e.g., dollars or dollar ratios (e.g., dollars per unit of time, dollars per skill, etc.). Customer satisfaction is multiple-dimensional and thus difficult and expensive to gauge precisely. There are at least two independent factors that contribute to customer satisfaction in IT service projects: on-time delivery and product quality. The assignment planning arranges assignment schedules to assure on-time delivery. Product quality may be measured and managed as a daily project management activity in the subsequent execution phase. In the present disclosure in one embodiment, on-time delivery is considered as the primary metric of quality of service (QoS).

Depending on the types of contract signed between a client and a service provider, delivery time may or may not be a decision that the latter can influence. Generally speaking, service contracts can be grouped into two broad categories: fixed-price and time-and-material. A time-and-material contract obligates the client to pay the service provider for the services it uses at a pre-agreed price. In such a contract, the service provider typically has little or no control over the delivery time: the client dictates what services with what skills to work on what tasks at when; and the service provider supplies the required services and executes the project accordingly. The service provider in this case acts as a service pool, with an incentive to maximize profit by assigning services to the most profitable (highest margin) tasks. This type of project is referred to as "rigid term", indicating that all service terms are fixed. In the communication pattern of rigid term projects, the client assigns the work to the service provider with the assumption that the latter will fulfill the request; and the service provider acknowledges the assignment and then executes it.

In a fixed-price contract, the client agrees to pay a fixed amount of money to the servicer provider (usually over a given period of time). During such a period (typically a few years), the service provider is obligated to fulfill all possible service requests (covered by the contract) issued by the client. Since the revenue is fixed, the servicer provider may have an incentive to postpone delivery time. Because of this, a fixed-price contract typically contains QoS clauses. A methodology of assignment planning in one embodiment of the present considers the relevant QoS clause as the required project delivery time. From a service provider's point of view, a project with a fixed completion time may be "flexible" in that it can plan assignments at its own discretion (as opposed to the case of rigid term projects) within the project deadline. Because of this, such a project is referred to as "flexible with deadline". For such a project, the client needs to communicate the deadline information to the service provider in addition to the required work. The latter needs to communicate back a project schedule to confirm that the deadline is met.

Yet another type of fixed-price projects are those that the client and the servicer provider collaborate to lay out both a project schedule and a assignment plan. Such a deep collaboration benefits both parties. Skill and/or asset availability impact project schedule. By sharing availability information with the client, the service provider can help the client to come up with a more realistic and cost-efficient project schedule. From the client perspective, negotiating a QoS term (delivery time in this case) in a project-by-project basis enables them to execute a fine-grained control over individual projects; it also avoids the client having to pay a higher premium for a fixed, pre-agreed QoS clause in the contract. Such projects are referred to as "flexible and negotiable". In daily project management operations of large service providers, such a negotiation may occur frequently. A client may consult its service provider on its next project schedule; a service provider may re-negotiate and modify a schedule (e.g., that might not be realistic) with its client. Communications involving this type of interaction (negotiation) in the present disclosure may be externalized and automated. The communication pattern of "flexible and negotiable" projects is iterative: the service provider may keep proposing increasingly better and more expensive schedules until the client accepts one.

Figure 7:
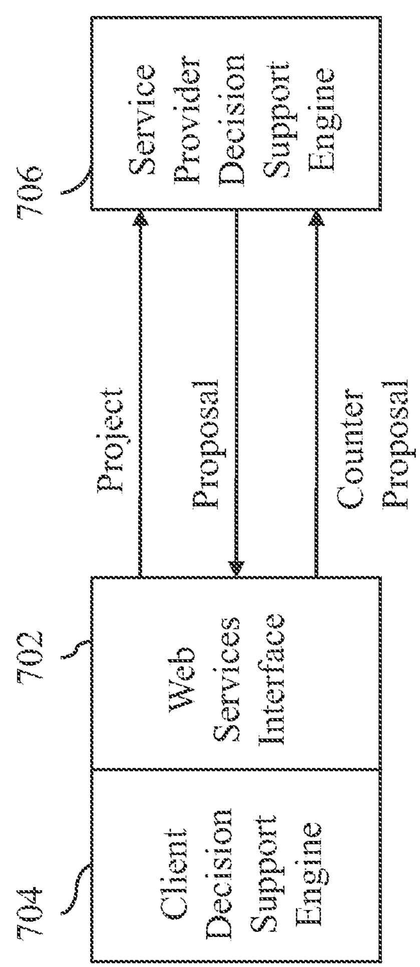
FIG. 7 illustrates a Web service interface in one embodiment of the present disclosure that may support the communication between a client and a service provider.

In one embodiment of the present disclosure, a web service interface may be provided that supports the communication patterns for negotiation between a buyer and a seller (e.g., client and a service provide), for example, described above. FIG. 7 illustrates a Web service interface that may support the communication between a client and a service provider. The client publishes service requests using the Web service interface 702. The service provider fetches the detailed project information, plans assignments accordingly, and then responds back with a project schedule proposal via the same interface 702. As an example, for rigid term and flexible with deadline projects, the interaction completes in one iteration; for flexible and negotiation projects, an iterative proposal and counter proposal cycle may follow. At each of the client and service provider side, a decision support engines 704 and 706 may provide the automation of communications for negotiations.

A project is a single service request from a client. It includes a set of tasks. A task requires a set of skills for a fixed period of times. Skill requests from a task are provisioned if and only if all the required skills are completely fulfilled for the whole given period of time. A task can be represented by a table as shown in Table 1.

TABLE 1

| Task 1 | 1 | 2 | 3 | . . . | L(i) |
|---|---|---|---|---|---|
| Skill 23 | 40 | 40 | 30 | . . . | 20 |
| Skill 12 | 50 | 40 | 0 | | |
| . . . | | | | | |
| Skill 9 | 30 | 0 | 40 | . . . | 0 |

Tasks may have different durations; time unit may be arbitrary, a task may require multiple skills to work in parallel, and skills form a simple discrete set.

Figure 8:
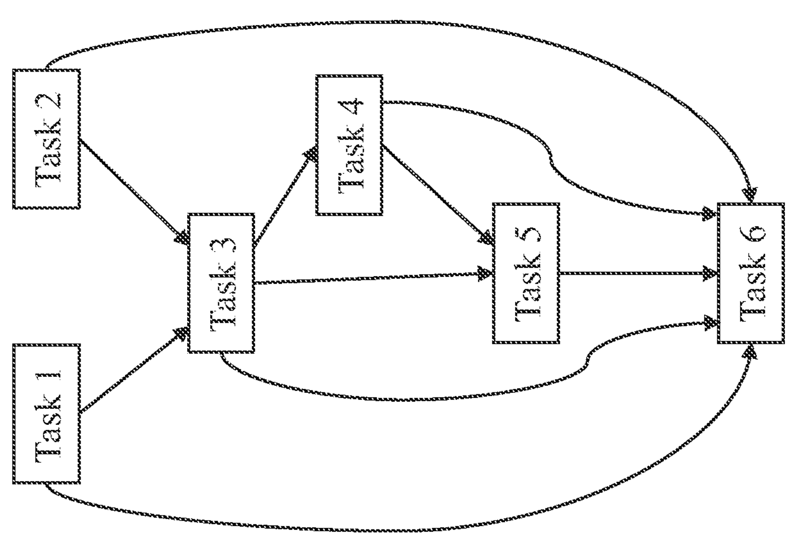
FIG. 8 shows an example project with 5 tasks.

Multiple tasks form a project. A task precedes another task if the latter must start after the completion of the former. A project can be viewed as a directed acyclic graph. FIG. 8 shows an example project with 5 tasks. Task 6 is a dummy task, representing the completion of the whole project.

Both the client and the service provider may use a backend decision support engine to support the negotiation process. The client's decision may include deciding whether or not to accept proposals submitted the service provider. The service provider may face a more complicated problem: it plans assignments and schedules the project. In one embodiment of the present disclosure, a mathematical programming based assignment planning or scheduling module or engine may be provided that is capable of handling communication patterns, for instance, described above for negotiating between a client and a service provider. A service provider may utilize the assignment planning or scheduling engine for negotiating with a client decision support engine.

In one embodiment of the present disclosure, a mathematical programming approach is taken to develop the assignment planning or scheduling module or engine. As a specific example, an assignment scheduling module or engine may include a formulation for flexible and negotiable projects. Other types of projects (communication patterns) may be handled. Continuing with an example mathematical formulation that may handle flexible and negotiable projects, the module or engine may define the following parameters (inputs) and generate the flowing decision variables (outputs).

I: set of tasks;

R: set of workers;

S: set of skills;

P: precedence relation between tasks;

$S(i) \subseteq S$, $i \in I$: set of skills required by task i;

$I(s) \subseteq I$, $s \in S$: set of tasks that require skill s;

$L(i)=\{1, \ldots, |L(i)|\}$: duration to task i;

$d(i, s \in S(i), l \in L(i))$: demand of skill s at time l of task i;

$S(r) \subseteq S$, $r \in R$: set of skills that worker r possess;

$R(s) \subseteq R$, $s \in S$: set of worker that possess skill s;

$T=\{1, \ldots, |T|\}$: planning horizon;

$h(r,t)$, $r \in R$, $t \in T$: availability of worker r at time t;

$x(i,t) \in \{0, 1\}$, $i \in I$, $t \in T$: binary decision variables indicating whether task i starts at time t.

$y(i,t,l)$, $i \in I$, $t \in T$, $l \in L(i)$: auxiliary decision variables that map local time l of task i to global time t;

$z(i, s, t, r)$, $i \in I$, $s \in S(i)$, $t \in T$, $r \in R(s)$: decision variables that represent the amount of asset or worker r assigned to task i to satisfy demand of skill s at time t.

Constraints of the assignment planning or scheduling module or engine are listed below:

$$\sum_{t \in \{1, \ldots, |T|-L(i)+1\}} x(i, t) = 1, \forall i \in I \tag{1}$$

$$\sum_{t \in \{|T|-L(i)+2, \ldots, |T|\}} x(i, t) = 0, \forall i \in I \tag{2}$$

$$0 \le y(i, t, l) \le 1, \forall (i, t) \in I \times T, l \in L(i) \tag{3}$$

$$x[i, t] \le y(i, t+l-1, l), \forall (i, t) \in I \times T, l \in L(i), \quad t + L(i) - 1 \le |T| \tag{4}$$

$$\sum_{t \in T} y(i, t, l) = 1, \forall i \in I, l \in L(i) \tag{5}$$

$$\sum_{s \in S(r), i \in I(s)} z(i, s, t, r) \le h(r, t), \forall r \in R, t \in T \tag{6}$$

$$\sum_{r \in R(s)} z(i, s, t, r) \ge \sum_{l \in L(i)} d(i, s, l) y(i, t, l), \quad \forall i \in I, \forall s \in S(i), \forall t \in T \tag{7}$$

$$L(i) + \sum_{t \in T} t x(i, t) \le \sum_{t \in T} t x(j, t), \forall (i, j) \in P \tag{8}$$

"local time" is used to refer to index l∈L(i) that represents the number of time periods after task i starts; as opposed to "global time" t∈T which indexes the absolute time periods within the planning horizon.

Binary variable x(i,t) marks the starting time of task i: x(i,t)=1 indicates that task i starts at time t, 0 otherwise. Constraint (1) guarantees that any task will start only once. Together with constraint (2), it also guarantees that any task i will start before it is too late, i.e., before period |T|−L(i)+2.

Auxiliary variable y(i,t,l) helps to map local time l to global time t. This is used because worker availability is expressed in terms of global time t, while demand is represented in terms of local time l. This is done through constraints (3)-(5).

Decision variable z(i, s, t, r) is the amount of worker r assigned to task i to fulfill the requirement for skill s at time at time t. Constraint (7) ensures that the sum of all such workers satisfies the demand d (i,s,l). Note that the formulation uses y(i,t,l) to map d (i,s,l), demand at local time l, to $$\sum_{l\in L(i)} d(i, s, l)y(i, t, l),$$

demand expressed in term of global time. Constraint (6) ensures that workers and/or assets are not over-utilized. Constraint (8) imposes the precedence relation between tasks.

For flexible and negotiable projects, the service provider minimizes the sum of time-span of all tasks, $$\min \sum_{t\in T} \sum_{i\in I} tx(i, t). \tag{9.1}$$

One can also minimize the time-span of the whole project, which is the starting time of the last dummy task, which is task |I|.

$$\min \sum_{t\in T} tx(|I|, t) \tag{9.2}$$

For flexible with deadline projects, the same formulation can be used to check if the deadline can be met. If not, the service provider would commit more workers and re-run the engine.

For rigid term projects, the project completion time is fixed. The whole project can be viewed as a single task as shown in Table 1. The service provider's incentive is to maximize profit, $$\max \sum_{i\in I, s\in S(i), t\in T} \left[ \sum_{l\in L(i)} p(s)d(i, s, l)y(i, t, l) - \sum_{r\in R(s)} c(r)z(i, s, t, r) \right], \tag{10}$$

where p(s) and c(r) are price of tasks and cost of asset or worker r, respectively. Note that objective function (10) requires flipping the inequality sign of constraint (7). This enables the service provider to find demand supply gaps.

As an example, a Web service interface of the present disclosure for enabling computer-to-computer negotiations between clients and service providers for assignment planning may be implemented using Apache™ CXF. Apache CXF separates service method stubs and their actual implementations. All methods that are needed to retrieve relevant information from the client is grouped into a single Java™ interface "Project" and annotated by @WebService, as shown in the code snippet below.

```
@WebSevice
public interface Project {
ProjectId getProjectId( );
TaskId[ ] getTaskId( );
TaskId[ ][ ] getTaskPrecedencyRelation( );
HashMap<TaskId, Integer> getTaskDuration( );
SkillId[ ] getSkillId( );
HashMap<TaskId, SkillId[ ]> getTaskRequiredSkill( );
HashMap<JobUnit, Double> getTaskDemand( );
Integer getDeadline( );
ProposalId
submitProposal(
   HashMap<TaskId, Integer> startingTime,
   ProjectId prjId);
ProposalStatus
queryProposal(ProposalId prpId);
}
```

The intended usage of these methods is self-explanatory by their names. For example, method "getTaskId" returns the id's of all the tasks that belong to this project; method get-TaskDuration" returns the duration of each task id. The service provider may use "submitProposal" to submit a schedule proposal, and "PropsalStatus" to check if the client approved or disapproved the proposal. If the proposal was rejected, the service provider would re-run the assignment planning or scheduling module and re-submit another, e.g., better one.

Figure 9:
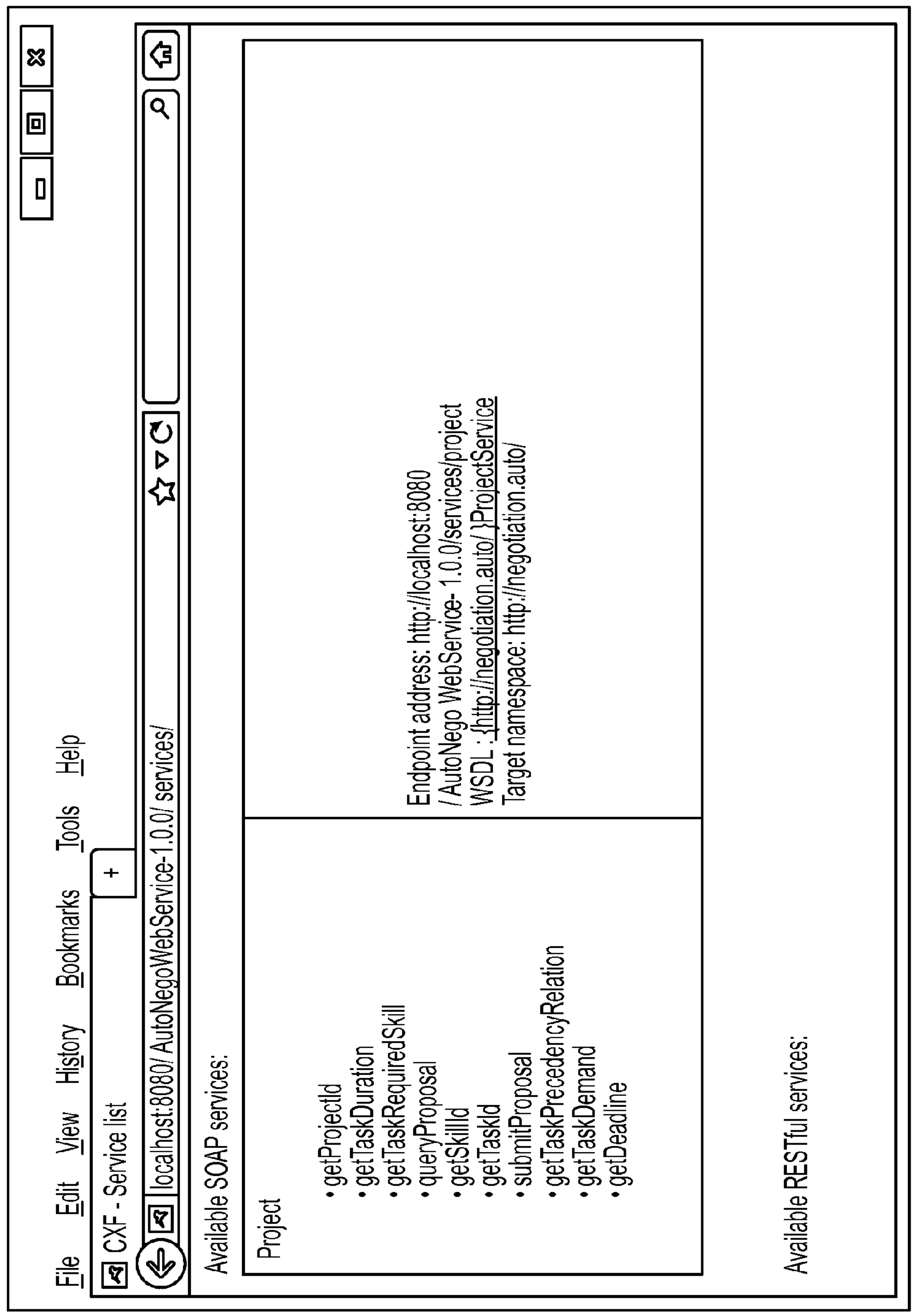
FIG. 9 illustrates an example screenshot of a Web service interface in one embodiment of the present disclosure.

An example of the Web service deployed on Tomcat™ is shown in FIG. 9, which illustrates an example screen shot of the Web service interface. At the back end, an example of a tool that may be used to implement the assignment scheduling module may include a GNU Linear Programming Kit (GLPK).

In the following description, two usage scenarios of a methodology of the present disclosure are presented as examples: one is a demand/capacity analysis for a simple rigid term project; the other shows a negotiation process for a flexible and negotiable project. Both scenarios are adapted from real data.

A. Simple Rigid Term Projects

Figure 10:
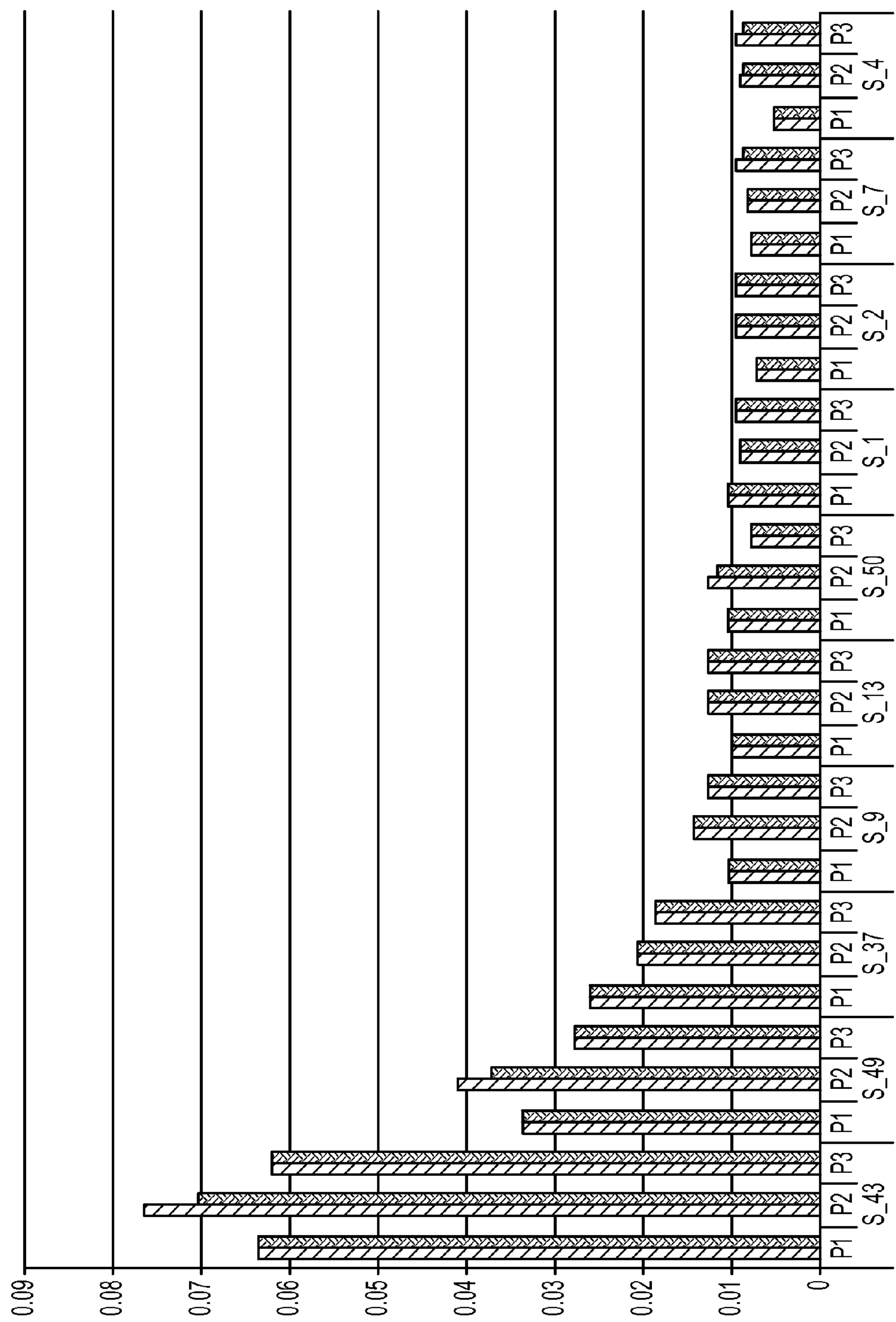
FIG. 10 illustrates an example demand supply gap of a simple rigid-term project.

A simple rigid term project can be viewed as a project with a single task node. For such a project, object function (Equation 10) can be used to find demand supply gaps. FIG. 10 shows the demand supply gap of a rigid term project by skills by time.

The y-axis is the normalized demand (the total demand across all skills and all time periods is 1). The bars represent demand (left bar) and supply (right bar), respectively. P1, P2, and P3 are indices of time periods. Note that there is a gap between demand and supply for skill "s_43" at time P2.

B. Negotiation

Consider an example scenario. The client's request in this usage scenario is decomposed into 22 tasks, indexed by integers from 1 to 22. Each task requires three types of skills: project manager, developer, and tester. Tasks can last from 1 to 4 weeks. The precedence relation between the tasks can be represented as: (3, 15), (11, 17), (4, 15), (6, 8), (1, 5), (9, 12), (15, 16), (4, 21), (3, 8), (3, 15), where each pair indicates that the second task depends on the completion of the first one.

Figure 11:
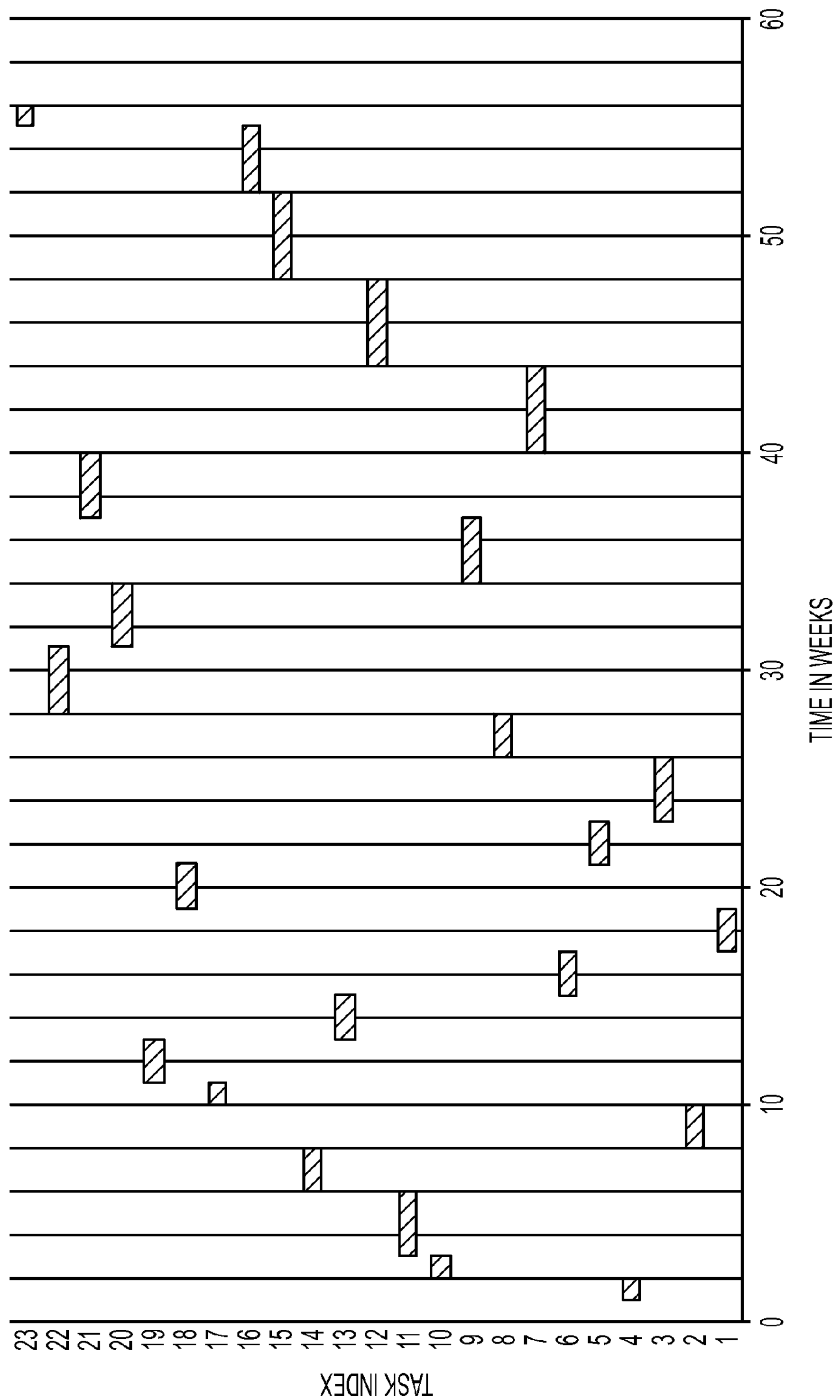
FIG. 11 illustrates a generated example schedule with 10 skill assignments.

In the first round of negotiation, the service provider commits 10 assignments (7 developers, 2 testers and 1 project manager). FIG. 11 shows the best schedule that minimizes the total project time-span. Task 23 in the FIGURE is a dummy one. Notice that no tasks overlap in time, which means that tasks were planned to be executed consecutively without any parallelization.

In the next round, the service provider adds 1 program manager and 1 tester, increasing the total number of assignments to 12. The total time-span is reduced to 27 weeks.

Figure 4:
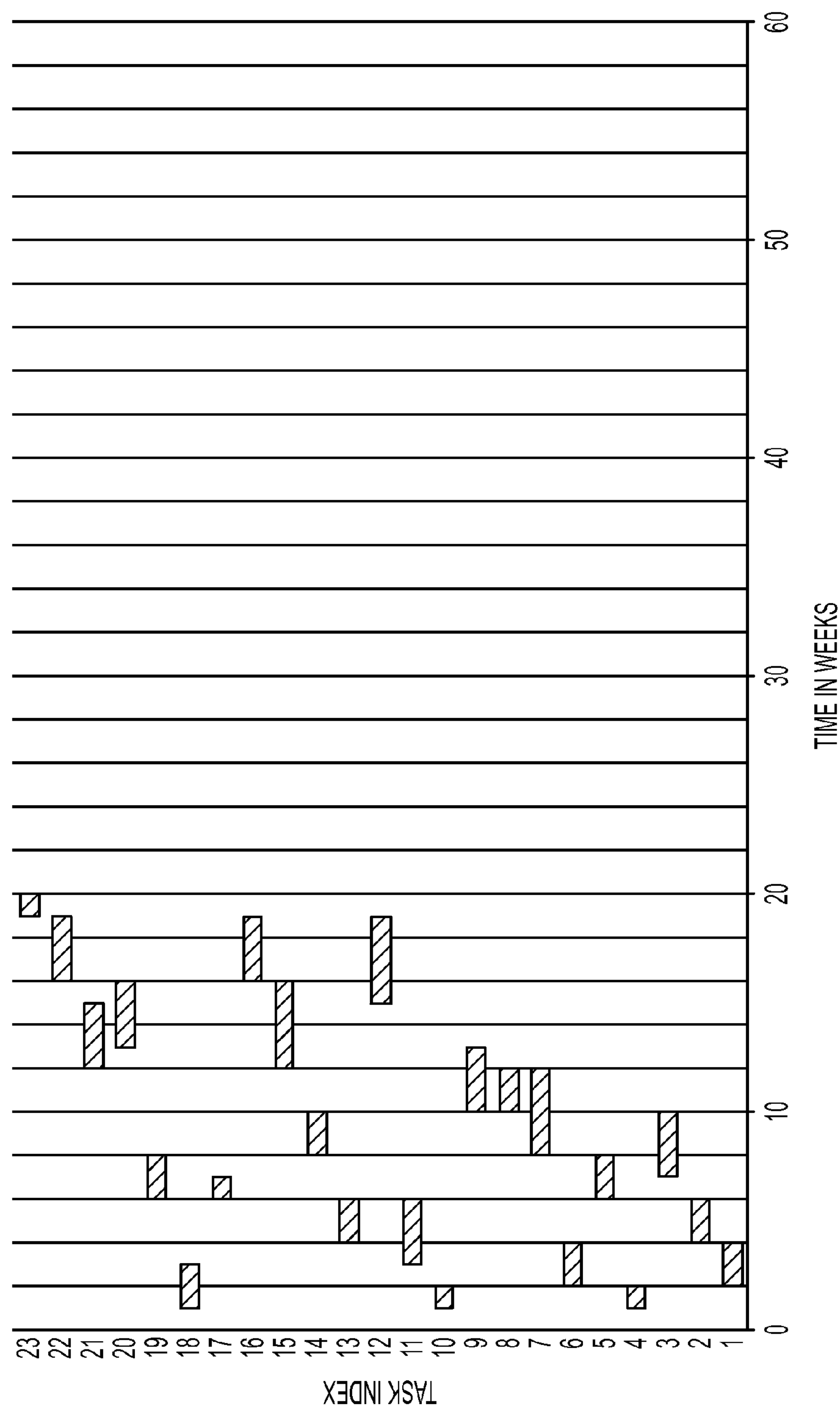
FIG. 4 illustrates a generated example schedule with 15 skill assignments.

In the third rounds, 3 additional assignments are committed (1 tester, 1 program manager and 1 developer), increasing the total number to 15. The best schedule is shown in FIG. 4. Compared with the initial round shown in FIG. 11, the total project time-span is significantly shorter (19 weeks vs. 55 weeks).

It is possible to further reduce the project time-span by committing more assignments. For example, if the service provider is willing to increase the number to 18 (by adding 1 program manager, 1 developer and 1 tester), the total project time-span could be reduced to 14 weeks (the detailed schedule is not shown). However, this schedule requires an 80% assignments increase compared with initial plan shown in FIG. 11. This may reduce any profits the service provider may have.

Figure 5:
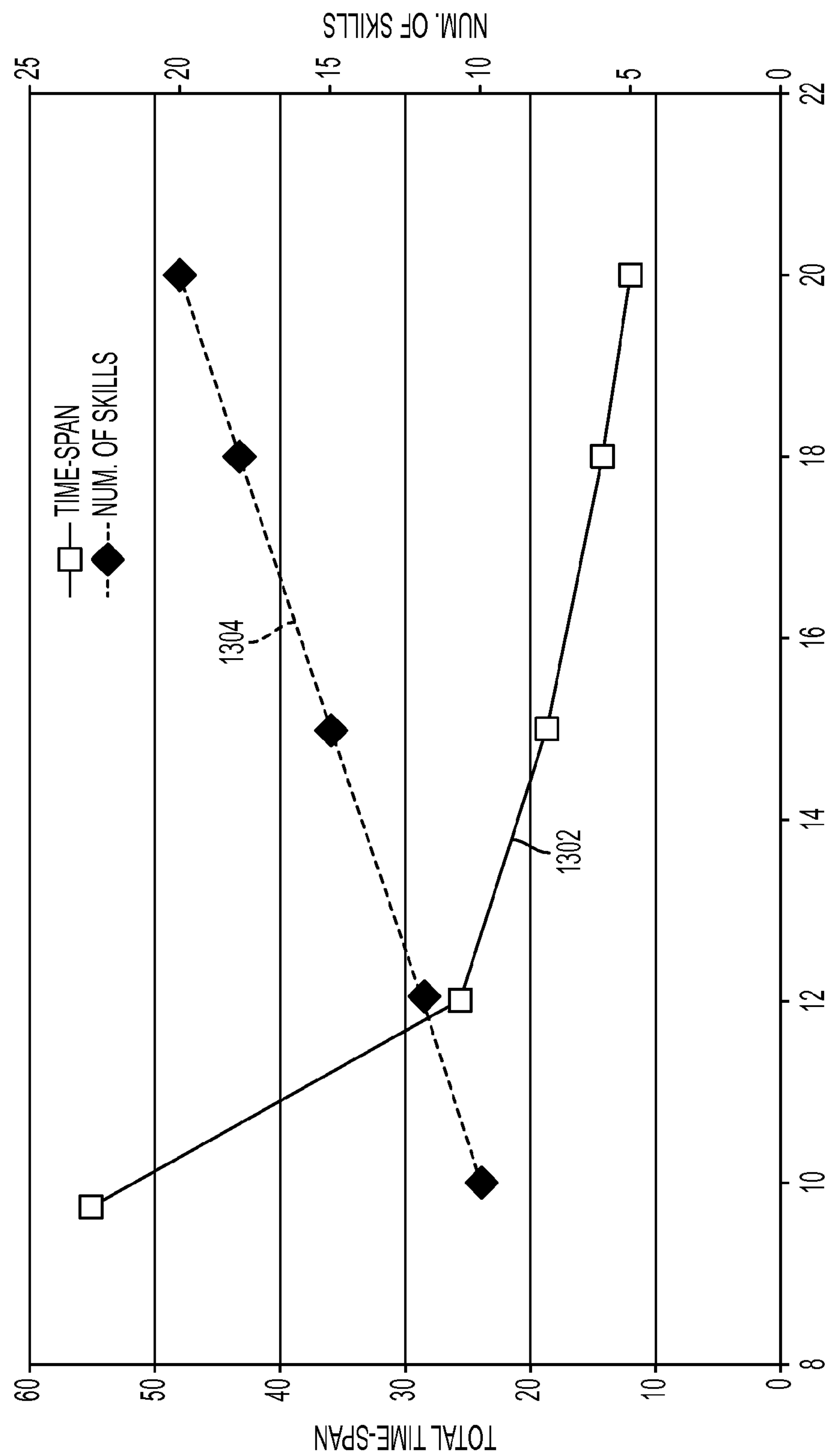
FIG. 5 illustrates a service provider's trade-off problem in one embodiment of the present disclosure.

FIG. 5 illustrates the trade-off the service provider faces: on the one hand, increasing amount of assignments reduces the total project time-span and boosts customer satisfaction 1302; on the other hand, this leads to a cost increase 1304.

For flexible and negotiable projects shown in this usage scenario, this trade-off drives the service provider's offer proposals. At some point of time, the negotiation process ends if the client is satisfied with the service provider's proposal, say, committing 15 assignments and finishing the project in 19 weeks.

For flexible with deadline projects, the service provider could follow the same process (without submitting the intermediate proposals that do not meet the deadline) to search for a schedule that meets the client's deadline.

The usage of physical assets is typically unique and predesigned. However, workforces may possess, or can be trained to acquire, multiple skills. This makes workforce optimization a more challenging problem. The methodology of the present disclosure in one embodiment enables machine-to-machine negotiation between clients and service providers, e.g., using standard Web services. In building an agent-based negotiation system (automated computer-implemented agents), 1) a common taxonomy that is shared by all participating agents; and 2) an unambiguously defined utility (incentive) of individual agents may be defined and used.

A common taxonomy defines a language understood by all agents that participate in the negotiation; and thus it enables cross-agent communication. An unambiguously defined utility makes sure that agents behave as their human masters expected (for example, never puts a bid that is a higher than the reservation price).

A methodology in one embodiment of the present disclosure assumes the client and the service provider share a common taxonomy of skills. For example, if a client requires a certain skill, say "program manager", the service provider understands what "program manager" means and then finds the right skill. In one aspect, it is considered that the skill taxonomy is a well-defined list shared by the client and the service provider, and that the service provider maintains a roster of the skills they have. With such a setup, when a client requests a certain skill, the service provider first searches the roster to find all qualified skills, and then runs the assignment planning or scheduling module, iteratively if needed, to plan assignments.

The utility of the service provider is implicitly defined through the optimization formulation. This can be better understood by examining FIG. 5, which illustrates the trade-off between the number of assets and/or skills and the total project time-span. The number of assets and/or skills determines costs, and the total project time-span represents the QoS. Combing these two curves, a utility curve is obtained for the service provider.

A system to support machine-to-machine negotiations between clients and service providers as described above may also be used to build a service exchange market where agents representing clients (buyers) and service providers (sellers) can negotiate service deals autonomously.

Figure 6:
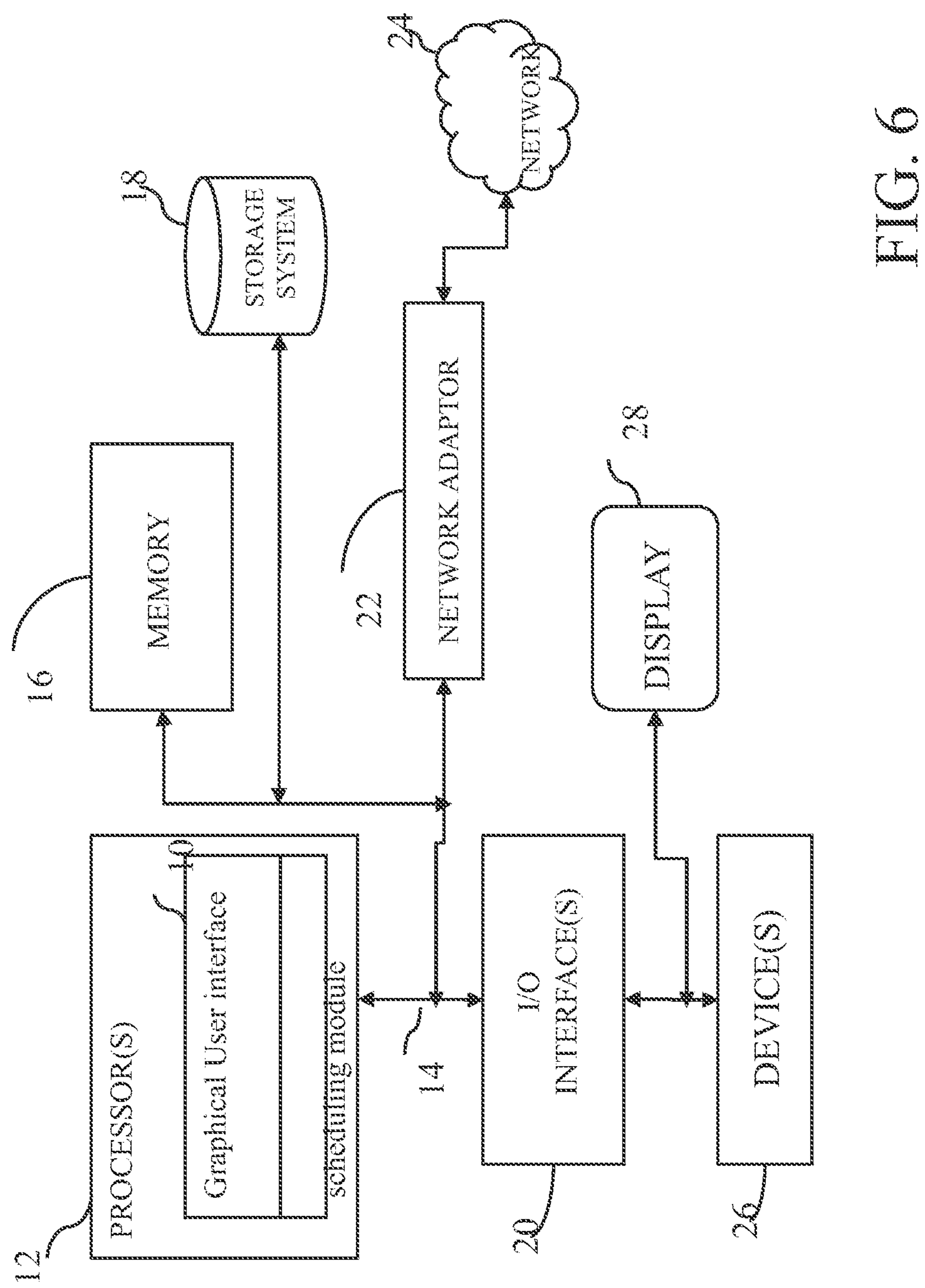
FIG. 6 illustrates a schematic of an example computer or processing system that may implement the system in one embodiment of the present disclosure.

FIG. 6 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 10 that perform the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms “computer system” and “computer network” as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some “functionality”, which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for assignment scheduling for service projects, comprising:

receiving, by at least one processor, a client service request;

preparing, by the at least one processor, input parameter data for servicing the client service request;

generating, by the at least one processor, a schedule for servicing the client service request by executing an optimization algorithm with the input parameter data;

transmitting, by the at least one processor, the schedule to a client;

determining, by the at least one processor, whether the schedule is acceptable by the client based on receiving an acceptance or rejection posted on a web by the client; and repeating automatically by the at least one processor, the preparing, the generating, the transmitting and the determining until it is determined that the schedule is acceptable by the client, wherein each iteration prepares different input parameter data for inputting to the optimization algorithm and generates a different schedule based on the different input parameter data, wherein the different input parameter data, which gradually increases number of assignments from a previous iteration, is prepared automatically by the at least one processor without receiving additional parameter data from the client, and wherein the optimization algorithm comprises maximizing a service provider's profit, $$\max \sum_{i\in I, s\in S(i), t\in T} \left[ \sum_{l\in L(i)} p(s)d(i,s,l)y(i,t,l) - \sum_{r\in R(s)} c(r)z(i,s,t,r) \right],$$

wherein p(s) represents price of task s and c(r) represent cost of r, d(i,s,l) represents demand of skill s at time l of task i, y(i,t,l) represents auxiliary variable that maps local time l to global time t, z(i,s,t,r) represents decision variables that represent amount of worker r assigned to task l to satisfy demand of skill s at time t, S(i) represents a set of skills required by task i, R(s) represents a set of workers that possess skill s, and L(i) represents duration to task i.

2. The method of claim 1, wherein the determining whether the schedule is acceptable by the client comprises detecting the client posting a rejection or acceptance on a client interface communicating with the at least one processor.

3. The method of claim 1, wherein the client service request is received via a web interface.

4. The method of claim 1, further comprising enabling automatically signing a service agreement by the at least one processor in response to determining that the schedule is acceptable by the client.

5. The method of claim 1, wherein the optimization algorithm comprises minimizing a total project time-span for a flexible and negotiable project.

6. The method of claim 1, wherein the optimization algorithm operates under a plurality of constraints, the plurality of constraints comprising:

that a task i will start only once;

that the task i will start before period $|T|-L(i)+2$, wherein T represents a planning horizon, L(i) represents a duration of said task i;

mapping of local time l to global time t;

sum of all worker r assigned to said task i satisfies a demand d(i,s,l) representing demand of skill s at time l of said task i;

said worker r are not over-utilized; and one or more precedence relationships between tasks are preserved.

* * * * *